United States Patent
Lee et al.

(10) Patent No.: US 10,097,251 B2
(45) Date of Patent: Oct. 9, 2018

(54) WIRELESS COMMUNICATION SYSTEM, METHOD FOR TRANSMITTING INFORMATION OF USER EQUIPMENT, METHOD FOR RECEIVING INFORMATION OF BASE STATION, AND USER EQUIPMENT AND BASE STATION THEREOF

(71) Applicant: KT CORPORATION, Gyeonggi-do (KR)

(72) Inventors: Hyo Jin Lee, Seoul (KR); Young Seok Kim, Seoul (KR); Do-Young Kwak, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 112 days.

(21) Appl. No.: 15/178,735

(22) Filed: Jun. 10, 2016

(65) Prior Publication Data

US 2016/0365957 A1 Dec. 15, 2016

(30) Foreign Application Priority Data

Jun. 15, 2015 (KR) .................. 10-2015-0084126
Jul. 10, 2015 (KR) .................. 10-2015-0098130

(51) Int. Cl.
*H04L 5/00* (2006.01)
*H04B 7/06* (2006.01)

(52) U.S. Cl.
CPC ......... *H04B 7/0608* (2013.01); *H04B 7/0639* (2013.01); *H04L 5/0023* (2013.01); *H04L 5/0051* (2013.01)

(58) Field of Classification Search
CPC ... H04B 7/0608; H04B 7/0639; H04L 5/0023; H04L 5/0051
See application file for complete search history.

(56) References Cited

U.S. PATENT DOCUMENTS

| | | | |
|---|---|---|---|
| 2012/0147766 A1* | 6/2012 | Kim | H04W 24/10 370/252 |
| 2012/0314665 A1* | 12/2012 | Ishida | H01Q 1/246 370/329 |
| 2013/0017863 A1* | 1/2013 | Kummetz | H04W 16/04 455/562.1 |
| 2013/0208678 A1* | 8/2013 | Zhang | H04L 5/0053 370/329 |
| 2015/0180684 A1* | 6/2015 | Chen | H04B 17/24 370/252 |
| 2015/0341093 A1* | 11/2015 | Ji | H04B 1/707 375/267 |
| 2016/0249279 A1* | 8/2016 | Koorapaty | H04W 48/16 |

FOREIGN PATENT DOCUMENTS

| | | |
|---|---|---|
| KR | 10-2012-0119175 A | 10/2012 |
| KR | 10-2013-0064464 A | 6/2013 |
| KR | 10-2015-0021261 A | 3/2015 |

* cited by examiner

*Primary Examiner* — Walli Butt
(74) *Attorney, Agent, or Firm* — IP Legal Services, LLC

(57) ABSTRACT

The present disclosure provides a wireless communication system including a plurality of remote units, and a digital unit configured to connect one output port to at least one of i) one remote unit having a maximum antenna number of antennas among the plurality of remote units and ii) two or more remote units each having antennas smaller than the maximum antenna number among the plurality of remote units.

16 Claims, 13 Drawing Sheets

WIRELESS COMMUNICATION SYSTEM, METHOD FOR TRANSMITTING INFORMATION OF USER EQUIPMENT, METHOD FOR RECEIVING INFORMATION OF BASE STATION, AND USER EQUIPMENT AND BASE STATION THEREOF

CROSS-REFERENCE TO RELATED APPLICATION

This application claims priority from Korean Patent Application Nos. 10-2015-0084126 & 10-2015-0098130, filed on Jun. 15, 2015 & Jul. 10, 2015, which is hereby incorporated by reference for all purposes as if fully set forth herein.

BACKGROUND OF THE INVENTION

1. Field of the Invention

The present disclosure relates to a technology for transmitting downlink data. The present disclosure relates to a technology that simultaneously transmits downlink data to a plurality of User Equipments (UEs) using the same time/frequency resources by a base station (i.e., an eNB) supporting downlink data transmission through a plurality of transmitting antennas.

2. Description of the Prior Art

An eNB supporting downlink data transmission through a plurality of transmission antennas simultaneously transmits downlink data to a plurality of UEs using the same time/frequency resources.

In particular, a specificeNB may support downlink data transmission to one spacial area using a plurality of transmitting antennas together, and the specific eNb equipment may support downlink data transmission to various different spatial areas by distributing a plurality of transmitting antennas.

In this case, a UE is required to generate and report information for identifying an eNB that supports downlink data transmission to various spatial areas by distributing a plurality of transmitting antennas.

SUMMARY OF THE INVENTION

In an aspect, the present disclosure provides a wireless communication system including a plurality of remote units and a digital unit. The digital unit is configured to connect one output to at least one of i) one remote unit having a maximum antenna number of antennas among the plurality of remote units and ii) two or more remote units each having antennas fewer than the maximum antenna number among the plurality of remote units.

The digital unit is configured to support a data service for a plurality of cell areas that respectively formed by each of the plurality of remote units.

The digital unit receives, from a specific User Equipment (UE), information for identifying a cell area where the specific UE locates, among the plurality of cell areas.

In another aspect, a method may be provided for transmitting information of a User Equipment (UE). The method may include receiving a Channel Status Information Reference Signal (CSI-RS); generating antenna port information for identifying an antenna port through the received CSI-RS; and transmitting the antenna port information.

In further another aspect, a method may be provided for receiving information of a base station. The method may include transmitting a Channel Status Information Reference Signal (CSI-RS); receiving, from a User Equipment (UE), antenna port information for identifying an antenna port; and identifying an area where the UE locates through the antenna port information, separately scheduling the UE included in the area, and performing a data transmission.

In still further another aspect, a User Equipment (UE) may be provided. The UE includes a communication unit configured to receive a Channel Status Information Reference Signal (CSI-RS); and a control unit configured to generate antenna port information for identifying an antenna port through the received CSI-RS. The communication unit transmits the antenna port information.

In yet another aspect, a base station may be provided. The base station may include a communication unit configured to transmit a Channel Status Information Reference Signal (CSI-RS) and configured to receive, from a User Equipment (UE), antenna port information for identifying an antenna port; and a control unit configured to identify an area where the UE locates through the antenna port information, to separately schedule the UE included in the area, and to perform a data transmission.

In still yet another aspect, a method may be provided for receiving information of a base station. The method may include receiving an uplink signal from a User Equipment (UE); and identifying an area where the UE locates by identifying whether the uplink signal is received from a specific antenna port, and performing a data transmission by separately scheduling the UE included in the area.

BRIEF DESCRIPTION OF THE DRAWINGS

The above and other objects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
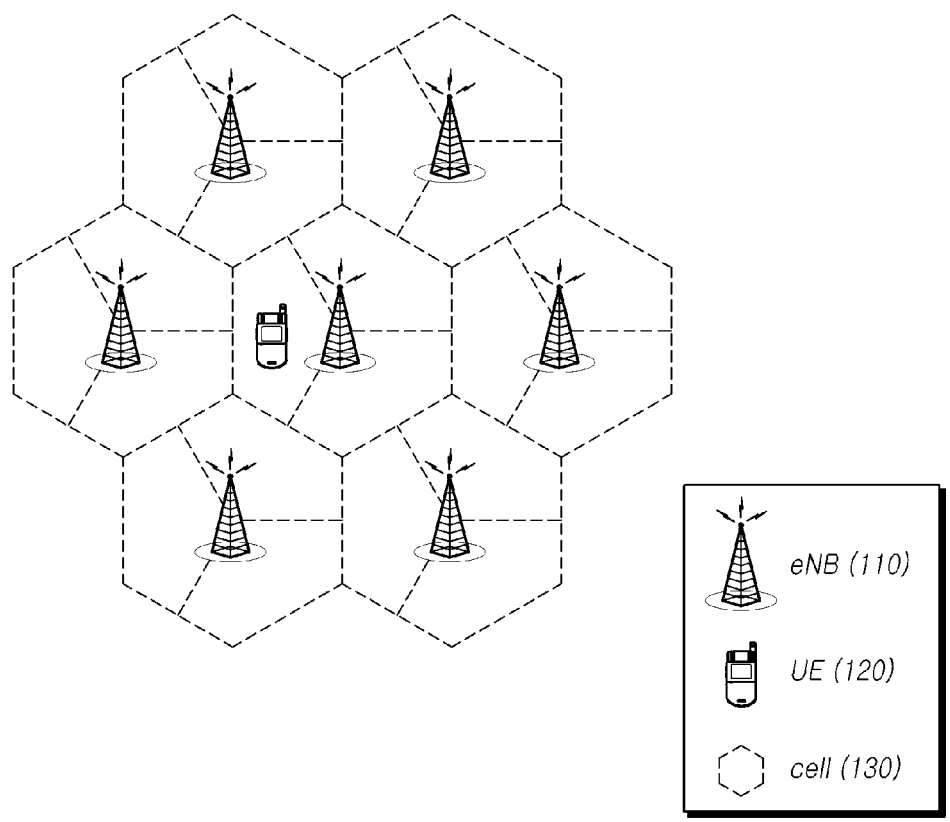
FIG. 1 illustrates a wireless communication system to which embodiments are applied.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

FIG. 1 illustrates a wireless communication system to which embodiments are applied.

The wireless communication system 100 may be widely installed so as to provide various communication services, such as a voice service, packet data, and the like.

The wireless communication system 100 may include a User Equipment (UE) 120 and a Base Station (BS or an eNB) 110. Throughout the specifications, the user equipment 120 may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station 110 may generally refer to a station that performs communication with a User Equipment (UE). The base station 110 may also be referred to as a Node-B, an evolved Node-B (eNB), a Sector, a Site, a Base Transceiver System (BTS), an Access Point, a Relay Node, a Remote Radio Head (RRH), a Radio Unit (RU), a small cell and the like.

In the present specification, the cell 130 may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells 130 has a base station that controls a corresponding cell. Thus, the base station may be construed in two ways: i) the base station may be a device itself that provides a mega cell, a macro cell, a micro cell, a pico cell, a femto cell, and a small cell in association with a wireless area, or ii) the base station may indicate a wireless area itself. In i), a base station may be any devices that interact with one another so as to enable the devices that provide a predetermined wireless area to be controlled by an identical entity or to cooperatively configure the wireless area. Based on a configuration type of a wireless area, an eNB, an remote radio head (RRH), an antenna, an radio unit (RU), a Low Power Node (LPN), a point, a transmission/reception point, a transmission point, a reception point, and the like may be embodiments of a base station. In ii), a base station may be a wireless area itself that receives or transmits a signal from a perspective of a terminal or a neighboring base station.

Hereinafter, a base station 110 may be referred to as a megacell, a macrocell, a microcell, a picocell, a femtocell, a small cell, an RRH, an antenna, an RU, an LPN, a point, an eNB, a transmission/reception point, a transmission point, and a reception point.

In the present specification, the user equipment 120 and the base station 110 are used as two inclusive transceiving subjects to embody the technology and technical concepts described in the specifications, and may not be limited to a predetermined term or word. The user equipment 120 and the base station 110 are used as two (uplink or downlink) inclusive transceiving subjects to embody the technology and technical concepts described in the specifications, and may not be limited to a predetermined term or word. Here, the Uplink (UL) refers to a scheme of performing transmission and reception of data by the user equipment 120 with respect to the base station 110, and Downlink (DL) refers to a scheme of performing transmission and reception of data by the base station 110 with respect to the user equipment 120.

There is no limitation on a multiple access technique to be applied to the wireless communication system 100. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The embodiments of present disclosure may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and the downlink may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell 130 may refer to the coverage of a signal transmitted from a transmission/reception point, a component carrier having the coverage of the signal transmitted from the transmission/reception point (transmission point or transmission/reception point), or the transmission/reception point itself.

A wireless communication system 100 according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" includes "an EPDCCH is transmitted to or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

The base station 110 performs downlink transmission to the UE 120. The base station 110 may transmit a Physical Downlink Shared Channel (PDSCH) which is a primary physical channel for unicast transmission. The base station 110 may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

The mobile communication system 100 has evolved into a high-speed, high-quality wireless packet data communication system to provide data services and multimedia services beyond the early voice-oriented services. Various mobile communication standards such as High Speed Downlink Packet Access (HSDPA), High Speed Uplink Packet Access (HSUPA), Long Term Evolution (LTE), and Long Term Evolution-Advanced (LTE-A) of the 3rd Generation Partnership Project (3GPP) have recently been developed to support high-speed and high-quality wireless packet data communication services. In particular, the LTE system, which is a system developed to efficiently support high speed wireless packet data transmission, maximizes wireless system capacity by using various wireless access technologies. The LTE-A system, which is a wireless system obtained by advancing the LTE system, has an improved data transmission capacity compared to the LTE system.

Generally, an LTE system refers to an eNB and a UE corresponding to a release 8 or release 9 of the 3GPP standard group. An LTE-Advanced system refers to an eNB and a UE corresponding to a release 10 of the 3GPP standard group. The 3GPP standard group is progressing a standard for a succeeding release, after the standardization of the LTE-Advanced system, that has an improved performance based on the standardization of the LTE-Advanced system.

Hereinafter, LTE/LTE-Advanced systems are exemplified as a wireless communication system described with reference to FIG. 1, but the present disclosure is not limited thereto.

The LTE/LTE-Advanced systems employ technologies of a Multiple Input Multiple Output (MIMO) and an Orthogonal Frequency Division Multiple Access (OFDMA), and utilize advantages of each technology well.

First, the MIMO in which a wireless signal is transmitted using a plurality of transmission antennas may be classified into a Single User-MIMO (SU-MIMO) for transmission to one UE and Multi-User-MIMO (MU-MIMO) for transmitting data to a plurality of UEs using the same time/frequency resources.

In the case of the SU-MIMO, the plurality of transmission antennas transmits wireless signals to a plurality of spatial layers for one receiver. At this time, the receiver is required to be equipped with a plurality of reception antennas in order to support the plurality of spatial layers.

In contrast, in the case of the MU-MIMO, the plurality of transmission antennas transmits the wireless signals to the plurality of spatial layers for the plurality of receivers. The MU-MIMO is more advantageous than the SU-MIMO in that the MU-MIMO does not require a receiver that is equipped with a plurality of reception antennas. However, as disadvantages, a mutual interference may be generated between the wireless signals for the different receivers since the wireless signals are transmitted for the plurality of receivers in the same frequency and time resources.

One of the main factors capable of obtaining a capacity increase through the OFDMA method is the performance of a scheduling of different UEs on a frequency axis. That is, as characteristics in which a channel is changed according to a time, when characteristics in which a channel is changed according to a frequency is additionally used, the characteristics are combined with a proper scheduling method, and thus a higher capacity gain may be obtained.

Figure 2:
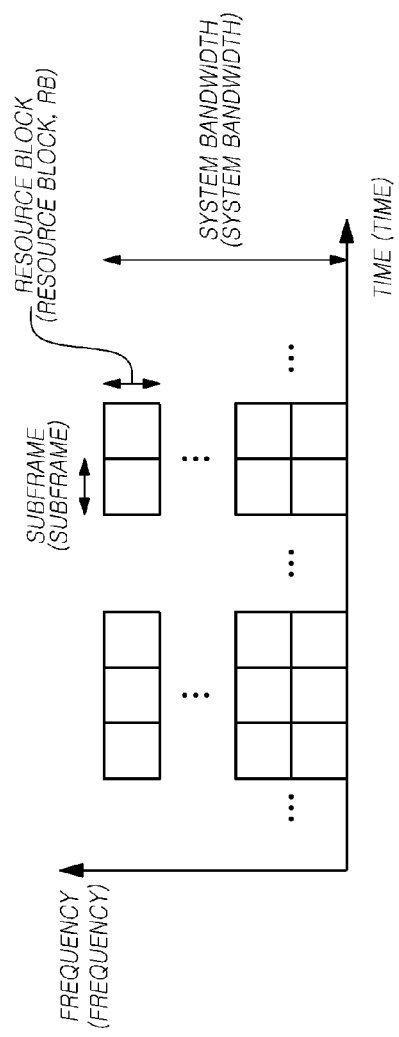
FIG. 2 illustrates time and frequency resources in LTE/LTE Advanced systems.

FIG. 2 illustrates time and frequency resources in LTE/LTE Advanced systems.

Referring to FIG. 1 and FIG. 2, a wireless resource transmitted from an eNB 110 to a UE 120 is divided in a unit of a Resource Block (RB) 220 on a frequency axis and is divided in a unit of a subframe 210 on a time axis. In the LTE/LTE-Advanced system, the resource block 220 generally includes 12 sub-carriers and occupies a bandwidth of about 180 kHz. In contrast, in the LTE/LTE-Advanced system, the subframe 210 generally includes 14 OFDM symbol sections and occupies a time period of 1 msec. The LTE/LTE-Advanced systems may allocate a resource in the unit of the subframe 210 on the time axis and may allocate the resource in the unit of the resource block 220 on the frequency axis, in performing a scheduling.

Figure 3:
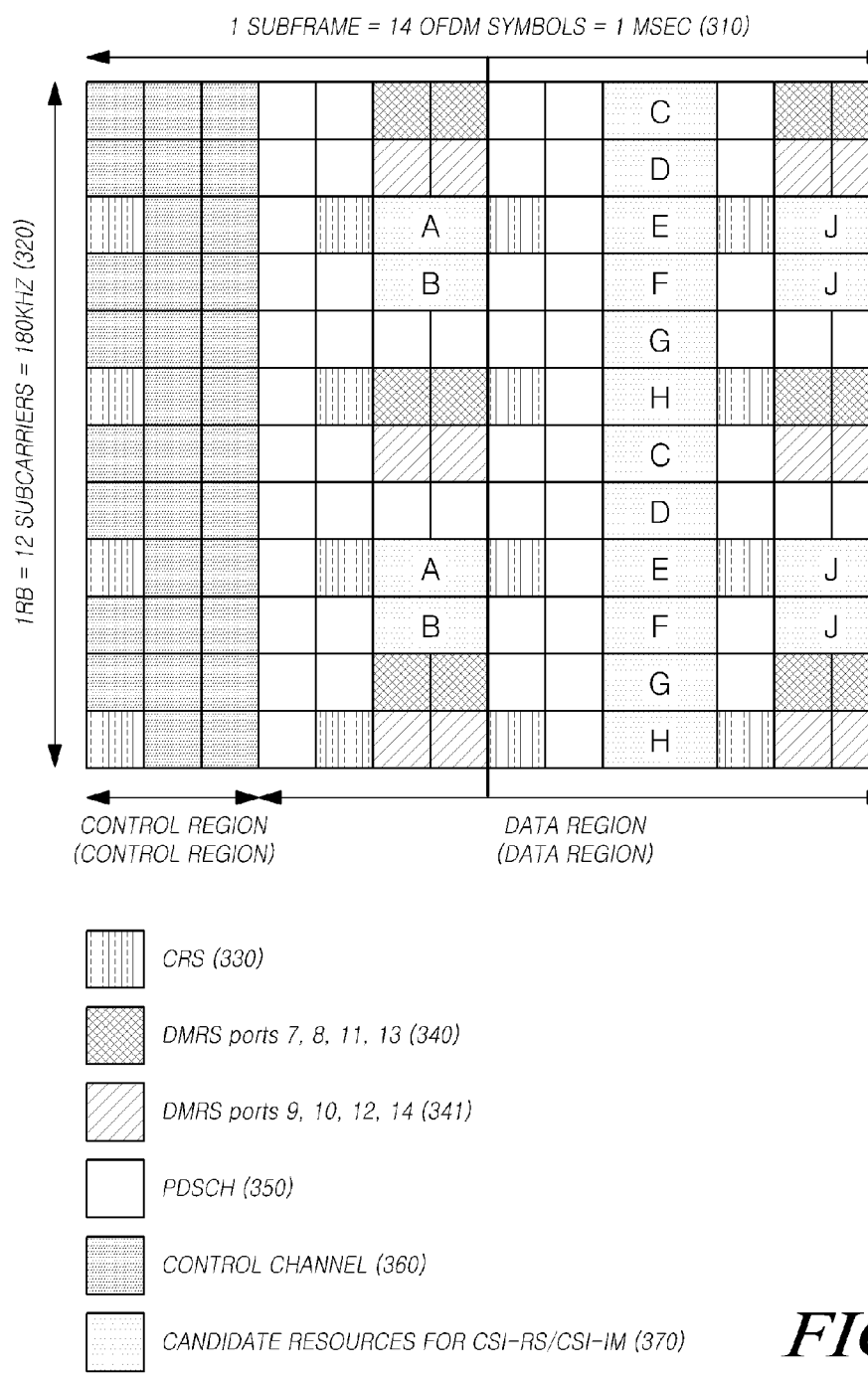
FIG. 3 illustrates a wireless resource of 1 subframe and 1 RB, which is a minimum unit for downlink scheduling in the LTE/LTE-Advanced systems.

FIG. 3 illustrates a wireless resource of 1 subframe and 1 RB, which is a minimum unit for downlink scheduling in the LTE/LTE-Advanced systems.

Referring to FIG. 3, the downlink scheduling unit of the LTE/LTE-Advanced systems includes one subframe 310 on a time axis and includes one RB 320 on a frequency axis. The wireless resource is formed of 12 subcarriers in the frequency domain and 14 OFDM symbols in the time domain. Thus, the wireless resource may have a total of 168 unique frequency and time locations. In the LTE/LTE-Advanced system, each unique frequency and time location of FIG. 3 is referred to as a Resource Element (RE). In addition, one sub-frame 310 is configured with two slots, each of which is configured with seven OFDM symbols.

The following several different types of signals may be transmitted in the wireless resource illustrated in FIG. 3.

1. Cell-specific Reference Signal (CRS) 330: a reference signal transmitted for a channel measurement of all UEs belongs to a specific cell 2. DeModulation Reference Signal (DMRS) 340 and 341: a reference signal transmitted for a data decoding of a specific UE 3. Physical Downlink Shared Channel (PDSCH) 350: a data channel transmitted in a downlink, the eNB uses the PDSCH to transmit data to the UE, and the PDSCH is transmitted using REs where the reference signal is not transmitted in the data area of FIG. 3.

4. Channel Status Information Reference Signal (CSI-RS) 370: The CSI-RS is a reference signal transmitted to a UE belongs to a specific signal transmission point, and is used for measuring a channel status. A plurality of transmission points may be included in one cell, and thus a plurality of CSI-RSs may be transmitted in one cell.

5. Other control channels 360 (e.g., PDCCH, PCFICH and PHICH): Other control channels 360 transmit control information necessary to receive a PDSCH by a UE or transmit ACK/NACK for an uplink HARQ operation.

In addition to these signals, the LTE-Advanced system may configure a muting such that a CSI-RS 370 transmitted by another eNB is received by UEs of a corresponding cell without interference. The muting may be employed in a position where the CSI-RS 370 may be transmitted. Generally, the UE skips a corresponding wireless resource and receives a data signal. In the LTE-Advanced system, the muting is also referred to as a zero-power CSI-RS as another term. This is because the muting is applied to the position of the CSI-RS 370 and no signal is transmitted since the transmission power is zero.

The CSI-RS 370 may be transmitted using some of the portions marked as A, B, C, D, E, F, G, H, I, and J according to the number of antennas transmitting the CSI-RS 370. In addition, the muting may be employed using some of the portions marked as A, B, C, D, E, F, G, H, I, and J. The number of antenna ports supported in the LTE-Advanced system is two, four, and eight. The CSI-RS 370 may be transmitted using two, four, and eight REs for each antenna port. When the number of antenna ports is two, in FIG. 3, the CSI-RS 370 is transmitted to a half of a specific pattern. When the number of antenna ports is four, in FIG. 3, the CSI-RS 370 is transmitted to a whole of the specific pattern. When the number of antenna ports is eight, in FIG. 3, the CSI-RS 370 is transmitted using two successive patterns. In contrast, the muting is formed in a pattern unit.

As described above, the LTE/LTE-Advanced systems utilize the MIMO technology for transmitting data using a plurality of transmission/reception antennas in order to increase a data transmission rate and a system capacity. Until now, the LTE-Advanced system supports up to eight antenna ports for each UE and supports a transmission of up to eight spatial layers at a time.

The UE 120 connected to the corresponding specific eNB 110 measures a downlink channel using the CSI-RS 370 and reports channel information on the downlink channel to the eNB, such that the specific eNB 110 performs a UE scheduling for the given time/frequency resources and determines a precoding method applied to the plurality of antennas. The LTE/LTE-Advanced system uses three following pieces of channel state information or channel feedback information (hereinafter, referred to as 'channel state information').

Rank Indicator (RI): information on the number of spatial layers preferred by the UE Precoding Matrix Indicator (PMI): information on an index of a precoding matrix preferred by the UE in a situation in which the most recently reported RI is given Channel Quality Indicator (CQI): information on a maximum Modulation and Coding Scheme (MCS) level satisfying a Block Error Rate (BLER) 0.1 in a situation in which the most recently reported RI/PMI are given Definitions and report periods for detailed RI/PMI/CQI refer to a 3GPP standard document [3GPP TS 36.213].

The wireless communication system described with reference to FIG. 1 may be implemented in various methods. Hereinafter, examples of the wireless communication system are described in detail with reference to FIG. 4 to FIG. 7.

Figure 4:
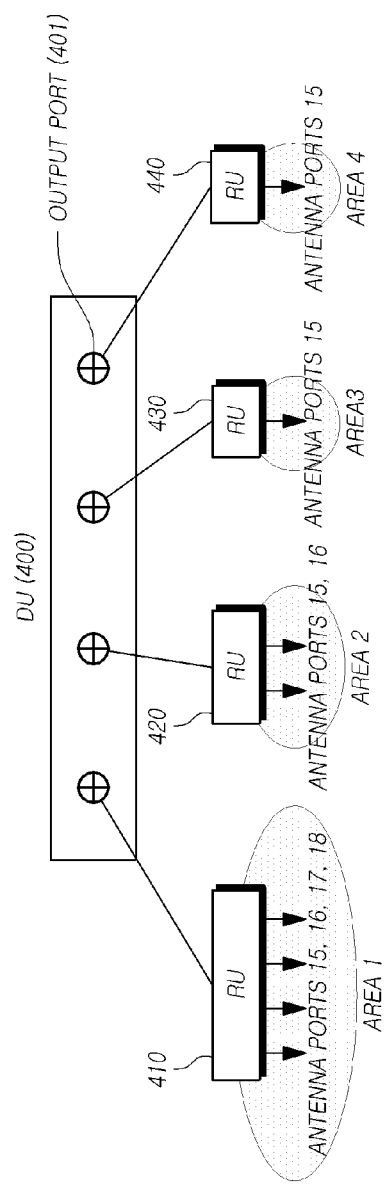
FIG. 4 is a view illustrating an exemplary structure of a wireless communication system for providing a data service to various cell areas.

FIG. 4 illustrates an exemplary structure of a wireless communication system for providing a data service to various cell areas.

Referring to FIG. 4, in the system includes a Digital Unit (DU) 400 and a plurality of Remote Units (RUs) 410 to 440 separated from the DU 400. At least one of the RUs 410 to 440 is directly connected to the DU 400.

The DU 400 is a device for performing general operations of an eNB. Each of output ports 401 of the DU 400 is respectfully connected to the RUs 410 to 440 that actually performs a wireless data transmission. Generally, functions corresponding to each output port 401 of the DU 400 are operated to perform all functions performed by one eNB together with functions of the connected RUs 410 to 440. In the case of the LTE/LTE-Advanced system, functions of all eNB shown in 3GPP standard document [3GPP TS 36.300] correspond to the functions corresponding to each output port 401.

Here, each of the RUs 410 to 440 should be installed in a corresponding cell area to transmit data to the UEs. However, it is not necessary to actually install the DU 400 connected to the various RUs 410 to 440 in the cell area. The DU 400 connected to the various RUs 410 to 440 may be installed in a separate space and may be connected to the RUs 410 to 440.

In addition, the RUs 410 to 440 are connected to at least one antenna port. The numbers of antenna ports shown in FIG. 4 indicate port numbers of a CSI-RS for the LTE-A system. The LTE-Advanced system is designed to give the CSI-RS port number from No. 15, and to allocate up to eight ports to No. 22. In the case of FIG. 4, the DU 400 has four output ports 401 and thus is connected to four RUs 410 to 440. Each of the RUs 410 to 440 has one or more antennas and transmits data to a specific cell area.

As described above, when one DU 400 provides a data service to the various cell areas, different output ports 401 are generally used for a data service for different areas, each of the RUs 410 to 440 connected to each output port 401 forms cells, and thus the data service is provided to the UEs included in a corresponding cell.

That is, in general, when one DU 400 provides the data service to four areas, the corresponding DU 400 should include four output ports, each output port is connected to a specific RU, and thus the data service may be provided to the corresponding area.

As shown in FIG. 4, it is assumed that each of four output ports 401 is connected to a first RU 410, a second RU 420, a third RU 430, and a fourth RU 440, and each of the RUs 410 to 440 provides the data service for a first area 1 (Area 1), a second area 2 (Area 2), a third area 3 (Area 3), and a fourth area 4 (Area 4). In addition, it is assumed that the area 1 (Area 1) is a very large space and thus the number of the connected UEs is large, the area 2 (Area 2) is smaller than that of the area 1 (Area 1) and thus the number of the connected UEs is smaller than that of the area 1 (Area 1), and the area 3 (Area 3) and the area 4 (Area 4) are very small spaces and thus the number of connected UEs is very small.

In general, when the MIMO technology using various antennas is used, the complexity of the DU 400 is increased, but the data service may be provided to a wider area. Therefore, it is assumed that the area 1 (Area 1) uses four antenna ports, the area 2 (Area 2) uses two antenna ports, and the area 3 (Area 3) and the area 4 (Area 4) uses only one antenna port.

Usually, since total calculation capacity and resource capacity of the DU 400 are to be designed under an assumption in which a maximum antenna number supported by each of all output ports 401 is used, in the case of FIG. 4, the total calculation capacity and resource capacity cannot be used. That is, since the DU 400 shown in FIG. 4 has a calculation capacity and a resource capacity capable of using up to four antennas in all output ports 401, in the first area 1 (Area 1), the capacity of the DU 400 may be used up to the maximum. However, in the second to fourth areas (Area 2, Area 3, and Area 4), the capacity of the DU 400 cannot be sufficiently utilized because of the small antenna number.

When one DU 400 provides the data service to various areas, a typical wireless communication system including the plurality of RUs 410 to 440 connected to one DU 400, each having different antenna numbers, and each using the output ports of different DUs as shown in FIG. 4 has disadvantages that the capacity of the DU cannot be sufficiently utilized as described above.

Embodiments described below provide a method of operating an eNB and related UE channel feedback operations for overcoming the disadvantages wherein the capacity of the DU cannot be sufficiently utilized because the various areas providing a wireless communication service for the DU supporting the plurality of antennas use different antenna numbers, as described with reference to FIG. 4.

In embodiments described below, a specific DU supports a data service for a plurality of cell areas using a plurality of antennas. In the embodiments described below, an entire capacity of a DU may be sufficiently utilized even when each cell area serviced by the specific DU receives a data transmission through an RU having different numbers of antennas.

That is, one RU having maximum antennas may be connected to one DU output port. However, after a plurality of RUs having antennas smaller than the maximum antenna number is connected to one DU output port, a feedback operation is performed such that the DU may know the type of the RU to which a specific UE belongs to one of the plurality of cell areas is connected. Therefore, the capacity of the DU may be sufficiently utilized.

Figure 5:
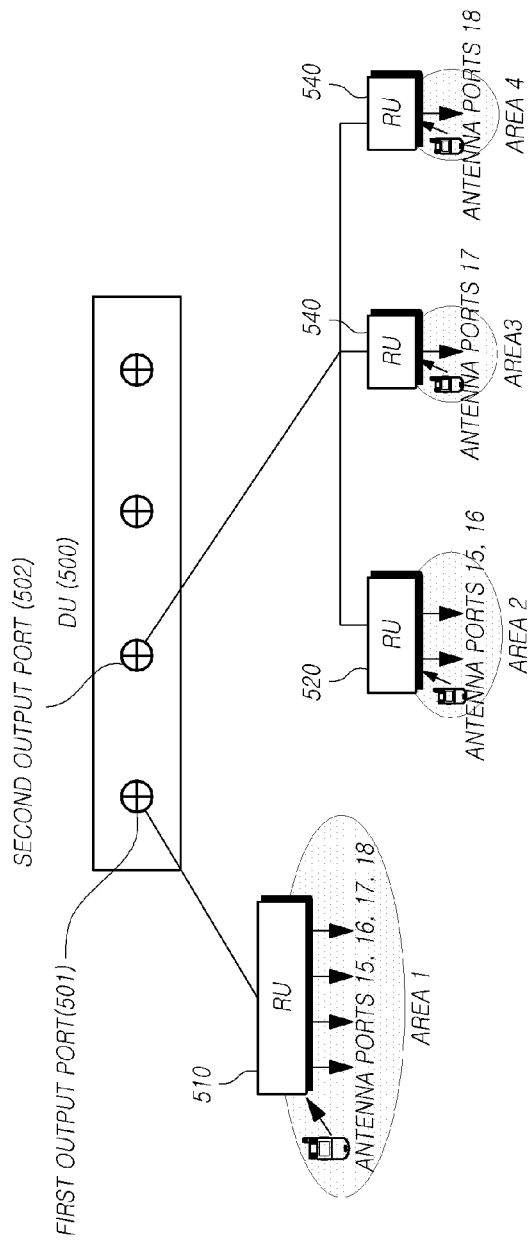
FIG. 5 is a view illustrating an exemplary wireless communication system structure according to an embodiment.

FIG. 5 illustrates an exemplary wireless communication system according to an embodiment.

Referring to FIG. 5, in the wireless communication system according to an embodiment, a Digital Unit (DU) 500 is separated from two or more Remote Units (RUs) 510 to 540, and at least one of RUs 510 to 540 is directly connected to one DU 500.

One RU 510 having a plurality of antennas may be connected to one output port 501 of the specific DU 500. Alternatively, the plurality of RUs 520, 530, and 540 having a comparatively fewer number of antennas may be connected to another output port 502.

For example, referring to FIG. 5, one first RU 510 having four antennas is connected to a first output port 501 of the DU 500. A second RU 520 having two antennas, a third RU 530 having one antenna, and a fourth RU 540 having one antenna are connected to a second output port 502.

As shown in FIG. 5, when the plurality of RUs 520, 530, and 540 share the same second output port 502, there is an advantage for sufficiently utilizing the capacity of the DU, which is different from the typical wireless communication system shown in FIG. 4.

For example, among signals outputted from the second output port 502 of the DU 500 for all of Antenna Ports (APs) 15, 16, 17, and 18, the second RU 520 uses signals for the Aps 15 and 16 by connecting the signals for APs 15 and 16 to each of two antennas, the third RU 530 uses a signal for the AP 17 by connecting the signal for AP 17 to one antenna, and the fourth RU 540 uses a signal for AP 18 by connecting the signal for AP 18 to one antenna.

However, the embodiments of the present disclosure are not limited thereto. For example, a separate signal distributor 603 may distribute the signals for all of the APs 15, 16, 17, and 18 output from the DU to transfer the signals to corresponding RUs, respectively, as shown in FIG. 6.

Figure 6:
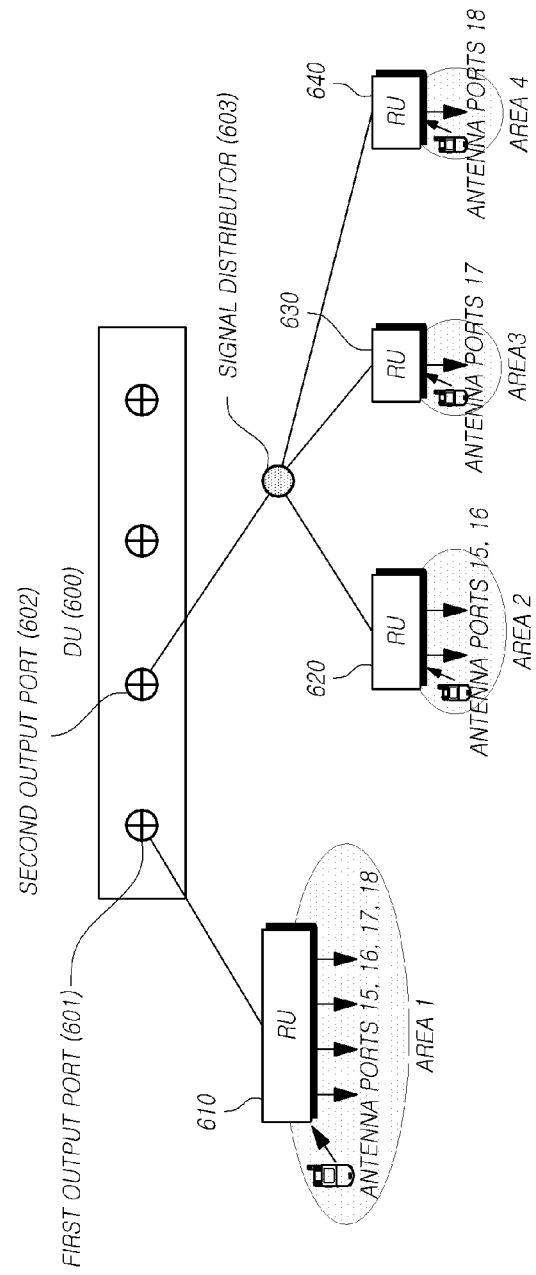
FIG. 6 is a view illustrating an exemplary wireless communication system structure according to another embodiment.

FIG. 6 illustrates an exemplary wireless communication system according to another embodiment.

Referring to FIG. 6, the wireless communication system according to another embodiment may include the signal distributor 603. Among signals output from a second output port 602, the signal distributor 603 may transfer a signal corresponding to the APs 15 and 16 to a second RU 620, may transfer a signal corresponding to the AP 17 to a third RU 630, and may transfer a signal corresponding to the AP 18 to a fourth RU 640. Therefore, the plurality of RUs 620, 630, and 640 may be connected to one second output port 602.

Figure 7:
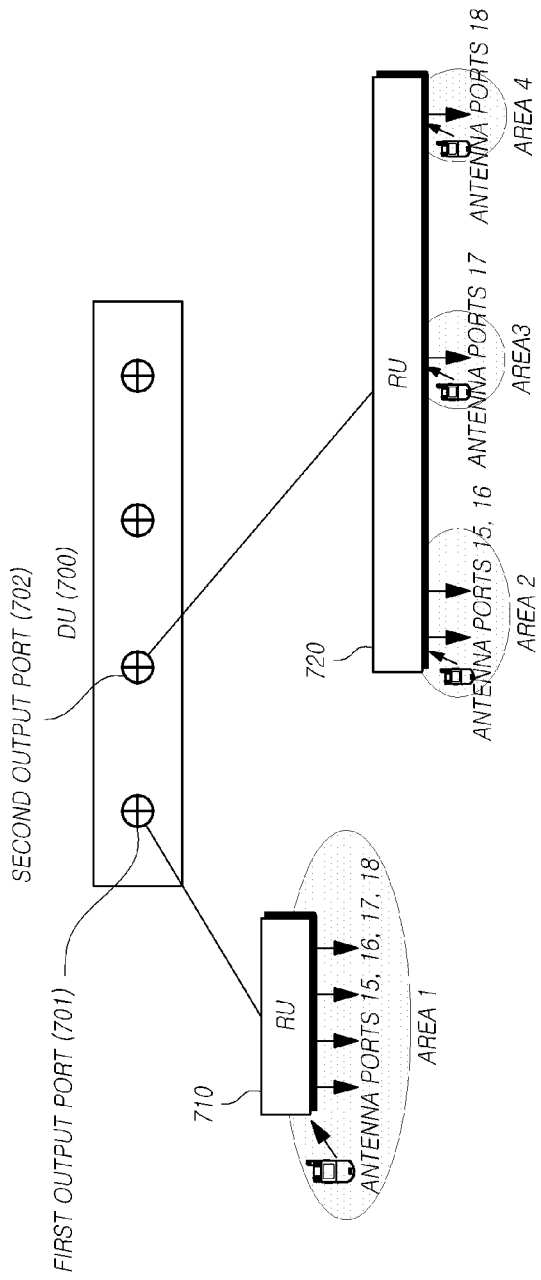
FIG. 7 is a view illustrating an exemplary wireless communication system structure according to further another embodiment.

FIG. 7 illustrates an exemplary wireless communication system according to further another embodiment.

As shown in FIG. 7, the wireless communication system according to further another embodiment may support services for various areas by distributely installing antenna ports (APs) in multiple areas in one second RU 720 supportable four APs. That is, antennas corresponding to the APs 15 and 16 of the second RU 720 may be installed in a second area 2 (Area 2), an antenna corresponding to the AP 17 may be installed in a third area 3 (Area 3), and an antenna corresponding to the AP 18 may be installed in a fourth area 4 (Area 4). Therefore, the APs output from one RU 720 may support the various areas.

All of the wireless communication systems according to embodiments shown in FIG. 5, FIG. 6, and FIG. 7 show the wireless communication system for the DUs 500, 600, and 700 supporting up to four APs. However, the embodiments of the present disclosure are not limited thereto. The embodiments of the present disclosure may be applicable to when the number of the antennas increases. For example, when a DU supports up to eight APs, all eight antennas may be used for one area. Alternatively, one, two, or four antennas may be distributed and installed to support an area.

All wireless communication systems according to the embodiments shown in FIG. 5, FIG. 6, and FIG. 7 may be recognized as identical from a view of the DU and the UEs belong to the first to fourth areas 1, 2, 3, and 4 (Area 1, Area 2, Area 3 and Area 4), since only connection from the DU to each AP is different. That is, in the wireless communication systems according to the embodiments shown in FIGS. 5, 6, and 7, one output port of a specific DU provides a data service to the UEs belong to the first area 1 to (Area 1) using the APs 15, 16, 17, and 18, the APs 15 and 16 for another output port provides the data service to the UEs belonging to the second area (Areas 2), the AP 17 provides the data service to the UEs belonging to the third area 3 (Area 3), and the AP 18 provides the data service to the UEs belong to the fourth area 4 (Area 4).

In the wireless communication system according to the embodiments shown in FIG. 5, FIG. 6, and FIG. 7, when the DU may identify the area where the specific UE is included, the overall system performance may be improved. If each area is sufficiently divided spatially, since UEs locate at different areas do not generate a mutual interference even though the UEs receive data simultaneously in the same time and frequency areas, resources may be reused in each area. That is, an eNB may receive a downlink channel feedback of a UE or may measure an uplink signal of the UE. Therefore, the eNB may identify the area where the UE is included. Thus, the overall system capacity may be increased.

In accordance with at least one embodiment, a first method may be provided for enabling an eNB to identify an area where a UE belongs, among areas divided by only an AP. The first method includes: receiving an uplink signal transmitted from the UE; identifying whether a signal is received from only a specific AP; determining that the UE locates at an area divided by an AP where a corresponding signal is received; and performing a UE scheduling. Here, the uplink signal may be at least one of an initial access signal of the UE, a sounding reference signal, a control signal and a data signal.

For example, the wireless communication system according to the embodiment shown in FIG. 5, the second output port 502 of the DU 500 providing the service at the second to fourth areas 2, 3, and 4 may measure the intensity of the uplink signal of the specific UE, which is possible according to each AP. The second output port 502 determines that the UE belongs to the second area 2 when the antenna port 15 (AP 15) and the antenna port 16 (AP16) receives a strong uplink signal which has a predetermined value equal to or greater than a predetermined threshold value. The second output port 502 determines that the UE belongs to the third area 3 when only antenna port 17 (AP 17) receives a strong uplink signal having a predetermined value equal to or greater than a predetermined threshold value. The second output port 502 determines that the UE belongs to the area 4 when only antenna point 18 (AP 18) receives a strong uplink signal having a predetermined value equal to or greater than a predetermined threshold value. Therefore, the scheduling may be performed separately on the UEs belonging to different areas. Thus, the overall system performance may be improved.

The wireless communication systems according to the embodiments shown in FIG. 6 and FIG. 7 perform similar operations for improving the overall system performance. For example, the eNB may receive the uplink signal transmitted from the UE, identify an only antenna port that receives the uplink signal, determine whether the UE belongs to the area divided by the identified AP, and may perform the UE scheduling.

A method may be provided for receiving information of an eNB according to further another embodiment. The method may include: a receiving step for receiving an uplink signal from a UE; and a scheduling step for identifying whether the uplink signal is received by a specific AP to divide an area where the UE belongs, for separately scheduling the UE that belongs to the area, and for performing a data transmission. As another method, a first area 1 and second to fourth areas 2, 3, and 4 using different APs may be operated as different cells, or may be divided using different CSI-RSs. Therefore, a DU may easily identify the area where a corresponding LTE-Advanced UE is included, among the area 1 and areas 2, 3, and 4, with respect to the existing LTE-Advanced UE. However, in the wireless communication system according to the embodiments shown in FIG. 5, FIG. 6, and FIG. 7, since the second to fourth areas 2, 3, and 4 are divided by only different APs connected to the same output port, it is difficult for the DU to detect the position where the UE is included, among the corresponding areas, using feedback information of the existing LTE-Advanced UE.

Figure 8:
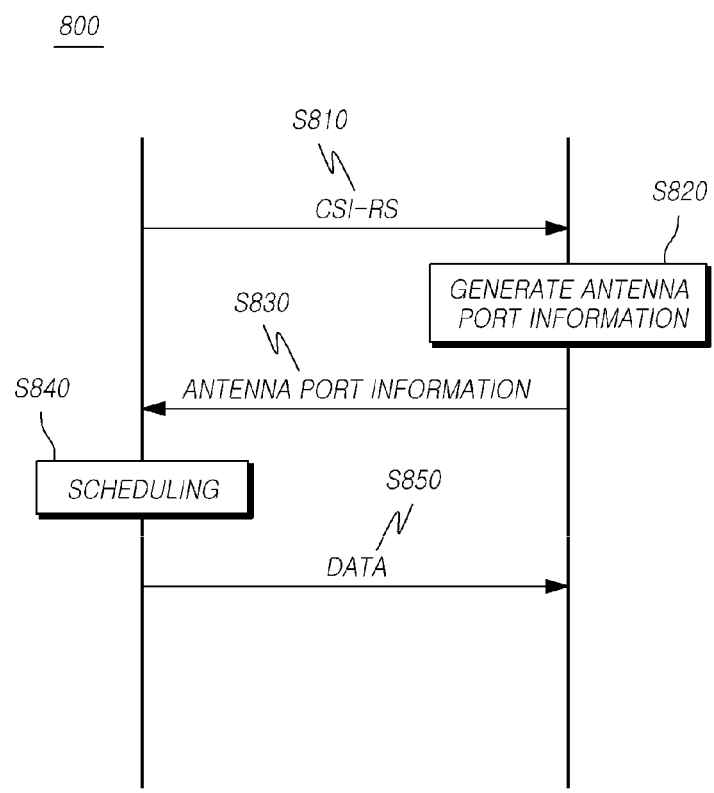
FIG. 8 is a flowchart for describing a method of transmitting and receiving information of a UE and an eNB according to an embodiment.

FIG. 8 is a flowchart for describing a method of transmitting and receiving information of a UE and an eNB according to further another embodiment.

Referring to FIG. 8, in a wireless communication system, the eNB and the UE transmits and receives information. Such a wireless communication system including the eNB may be the wireless communication systems described with reference to FIG. 5 to FIG. 7. As shown in FIG. 5 to FIG. 7, the wireless communication system may be a wireless communication system in which one output port of the DU is connected to two or more RUs as shown in FIG. 5 to FIG. 7, and the wireless communication system may be the wireless communication system in which one output port is connected to only one RU as shown in FIG. 4.

The DU and RUs described with reference to FIG. 5 to FIG. 7 may perform a role of the eNB.

First, the eNB transmits a CSI-RS and the UE receives the CSI-RS (S810).

Next, the UE generates antenna port information for identifying an antenna port through the received CSI-RS (S820).

Next, the UE transmits antenna port information and the eNB receives the antenna port information.

Next, the eNB identifies an area where the UE is located through the received antenna port information and separately schedules the UE included in the area (S840).

Next, the eNB transmits data to the UE according to the scheduling (S850).

At this time, the antenna port information may be included in channel state information or in a newly defined port indicator (or port index), and then may be transmitted. The channel state information may be a Precoding Matrix Index (PMI).

Meanwhile, when the number of the APs is N, ($\log_2 N+1$) bit of antenna port information for identifying all possible combinations of one, two, or N APs may be generated.

When the number of the APs is N, specific bits of antenna port information identifying only some of all possible combinations of one, two, or N APs may be generated.

When antenna port information is included in port information, the port information may be transmitted at a timing that is equal to that of the channel state information, or may be transmitted in a period corresponding to integer times of a rank index, which is one of the channel state information.

Hereinafter, an operation for transmitting the antenna port information through the precoding matrix index, which is one of the channel state information, will be described in detail. A first method may enable a UE to report an area where the UE locates among areas identified by one an antenna port. In the first method, such antenna port information is transmitted through the precoding matrix index. Such a first method may add information for identifying a corresponding antenna port to precoding matrix information (e.g., a precoding matrix index) reported by the UE.

For example, in the wireless communication system described with reference to FIG. 5 to FIG. 7, when the UE receives the CSI-RS for four APs and reports [1, 1, 0, 0] as a preferring precoding matrix in response to the CSI-RS, the eNB may identify that the UE belongs to the area 2. In contrast, when the UE reports [0, 0, 1, 0] as the preferring precoding matrix, the eNB may identify that the UE belongs to the area 3.

In a typical circumstance, the output port of the specific DU supports N APs and the specific UE receives the CSI-RS having N APs.

Therefore, when a DU adds N precoding matrixes {[1, 0, 0, . . . , 0], [ 0, 1, 0, . . . , 0], [0, 0, 1, . . . , 0], [0, 0, 0, . . . , 1]} to a set of precoding matrixes that may be selected by the UE, in order to identify areas formed by only one AP, the DU may identify the AP to which the UE belongs among N APs through the PMI reported from the UE.

In addition, in order to identify areas formed by only two APs, the following (N−1)×4 precoding matrixes are added:
{[1, 1, 0, . . . , 0], [1, −1, 0, . . . , 0], [1, j, 0, . . . , 0], [1, −j, 0, . . . , 0], [0, 1, 1, . . . , 0], [0, 1, −1, . . . , 0], [0, 1, j, . . . , 0], [0, 1, −j, . . . , 0][0, 0, . . . , 1, 1], [0, 0, . . . , 1, −1], [0, 0, . . . , 1, j], [0, 0, . . . , 1, −j]}

Among (N−1)×4 precoding matrixes, the first four precoding matrixes indicate that the UE locates at areas formed by only first and second CSI-RS APs, and each of the first four precoding matrixes includes actual precoding matrix information applied to corresponding first and second CSI-RS APs.

When the DU receives the above-mentioned added precoding matrix through the RU, the DU may separately identify the UEs each locating at different areas, perform scheduling, and reuse the resources according to each area.

Hereinafter, an operation for including antenna port information in a newly defined port indicator or a port index and transmitting the antenna port information will be described.

A second method may improve the frequency efficiency. In the second method, the UE reports an area where the UE locates, among areas (e.g., the area 2, area 3 and area 4 of FIG. 5, FIG. 6 and FIG. 7) identified by only the AP, and the DU performs a scheduling using this information. The second method enables the DU to reuse the resources according to each area by performing the scheduling after identifying the UEs included in separate areas, when the UE reports port information (or Port Indicator (PI)) on APs preferred to be used among all APs, to the DU through the RU.

That is, in the wireless communication system shown in FIG. 7, when the CSI-RS signal is checked in only the AP 15 and AP 16 because the UE belongs to the area 2, although the UE receives the CSI-RS having four APs (AP 15, AP 16, AP 17, and AP 18), the UE may report additional feedback information including antenna port information to the eNB.

With respect to the UE receiving the CSI-RS having four APs, the port information, which may report the areas identified by only the Aps, may include three bits expressing the following eight circumstances.

1. The case in which only one AP is identified: {AP15}, {AP16}, {AP17}, {AP18}
2. The case in which only two APs are identified: {AP15, AP16}, {AP16, AP17}, {AP17, AP18}
3. The case in which all APs are identified: {AP15, AP16, AP17, AP18}

That is, after UE is configured to receive the CSI-RS having four APs and feed back information on the preferring APs, when the UE performs a feedback using three bit port information to inform of the circumstance among the above-mentioned eight circumstances, the UE may identify the area where the UE locates, may perform the additional scheduling operation, and thus may increase the capacity of the overall system.

In the similar manner, when the UE is configured to receive the CSI-RS having eight APs {AP15, AP16, . . . , AP22} and feed back the port information on the preferring APs, information enabling the UE to report the area identified by only the APs may include four bits expressing the following 16 circumstances.

1. The case in which only one AP is seen: {AP15}, {AP16}, . . . , {AP22}
2. The case in which only two APs are seen: {AP15, AP16}, {AP16, AP17}, . . . , {AP21, AP22}
3. The case in which all APs are seen: {AP15, AP16, . . . , AP22}

Here, the four bit information represents three cases in which one area uses one, two, or all of eight antenna ports. In order to include a case in which four APs are seen, the port indicator may be configured to have five bits.

When there are N antenna ports, and one specific area may be formed by one, two, or N antenna ports, the port indicator may be formed of ($\log_2 N+1$) bit information for enabling the UE to report an area identified by only APs.

As another method, when the number of separately configurable maximum areas is reduced by using an individual one AP or two APs with respect to N APs, corresponding information may maintain a fixed bit number or more. For example, when the probability of an area formed by one AP is limited to eight types and the probability of an area formed by only two APs is limited to seven types, all circumstances may be expressed with 16 types (i.e., 4 bits of port indicator), equally to the case wherein it is configured to receive eight CSI-RS and to perform a feedback to transmit information on the preferring APs, which is the above-mentioned example:

1. The case in which only one AP is seen: {AP15}, {AP16}, {AP17}, . . . , {AP22}
2. The case in which only two APs are seen: {AP15, AP16}, {AP16, AP17}, {AP21, AP22}
3. The case in which all APs are seen: {AP15, AP16, . . . , AP(N+14)}

In a similar manner, when the probability of an area formed by one AP is limited to four types and the probability of an area formed by two APs is limited to three types with respect to N APs, all circumstances may be expressed with the following eight types (i.e., three bits of port indicator):

1. The case in which only one AP is seen: {AP15}, {AP16}, {AP17}, {AP18}
2. The case in which only two APs are seen: {AP15, AP16}, {AP16, AP17}, {AP17, AP18}
3. The case in which all APs are seen: {AP15, AP16, . . . , AP(N+14)}

When the information reported by the UE to report the area to which the UE is positioned among areas identified by only APs is referred to as a Port Indicator (PI), corresponding information may be reported at the timing that is equal to that of RI/PMI/CQI together with the RI/PMI/CQI defined in the existing LTE. As another method, the corresponding information may be reported at a separate timing in a period corresponding to integer times of a period in which the RI is reported.

Figure 9:
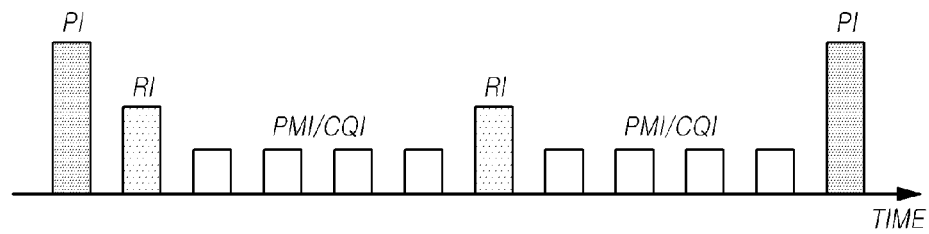
FIG. 9 illustrates an example of the timing when a Port Indicator (PI) is reported.

FIG. 9 illustrates an exemplary timing when a Port Indicator (PI) is reported.

Referring to FIG. 9, in a feedback mode of RI/PMI/CQI of the existing LTE, the PMI/CQI are periodically reported at the same timing, and the feedback of the RI is performed in a period corresponding to integer times of the period of the PMI/CQI, in response to the report of the PMI/CQI. In such a circumstance, the PI may be reported at a separate timing in a period corresponding to integer times of the period in which the RI is reported. The PI may also be reported at the timing having a separate offset, like the RI and PMI/CQI are reported at the timing having a separate offset in the LTE.

Figure 10:
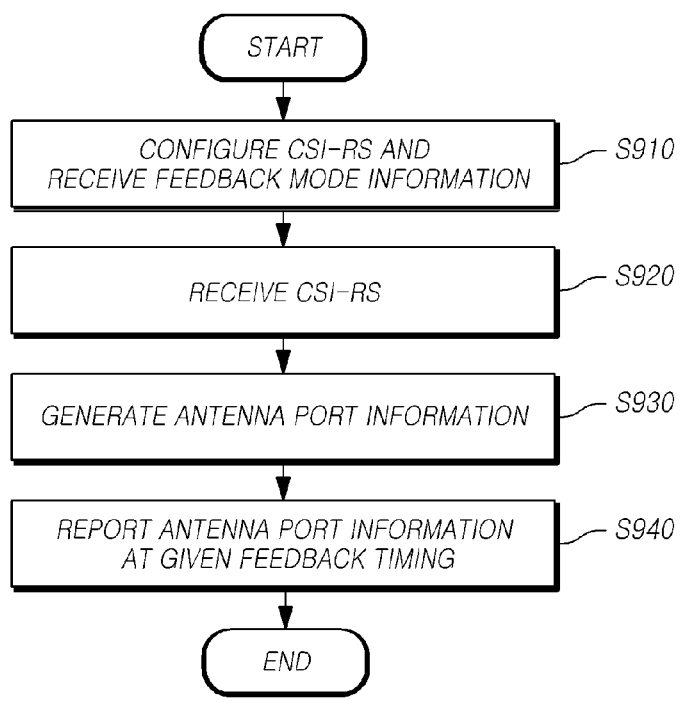
FIG. 10 is a flowchart for describing an operation of a UE according to an embodiment.

FIG. 10 is a flowchart for describing an operation of a UE according to an embodiment.

Referring to FIG. 10, in an operation 900 of a UE according to an embodiment, the UE receives a CSI-RS configuration and feedback mode information from an eNB (S910). In step S910, the feedback mode information may include information on whether the UE reports a PMI corresponding to the above-mentioned new precoding matrix or information on whether the UE reports the above-mentioned PI. In addition, the feedback mode information may include information on the feedback timing.

Next, the UE receives the CSI-RS according to the CSI-RS configuration (S920). In step S920, the UE estimates a channel through the CSI-RS. In addition, in step S920, the UE identifies an area where the UE locates through the CSI-RS.

Next, the UE generates the PMI in a codebook including the new precoding matrix or generates the antenna port information including the above-mentioned PI (S930).

Next, the UE reports corresponding antenna port information included in the PMI or the PI to the eNB at the given feedback timing (S940). Regarding the feedback timing, as described with reference to FIG. 9, the port information may be transmitted at the timing that is equal to that of the channel state information when the antenna port information is included in the port information, or may be transmitted in a period corresponding to integer times of a Rank Index (RI), which is one of the channel state information.

Figure 11:
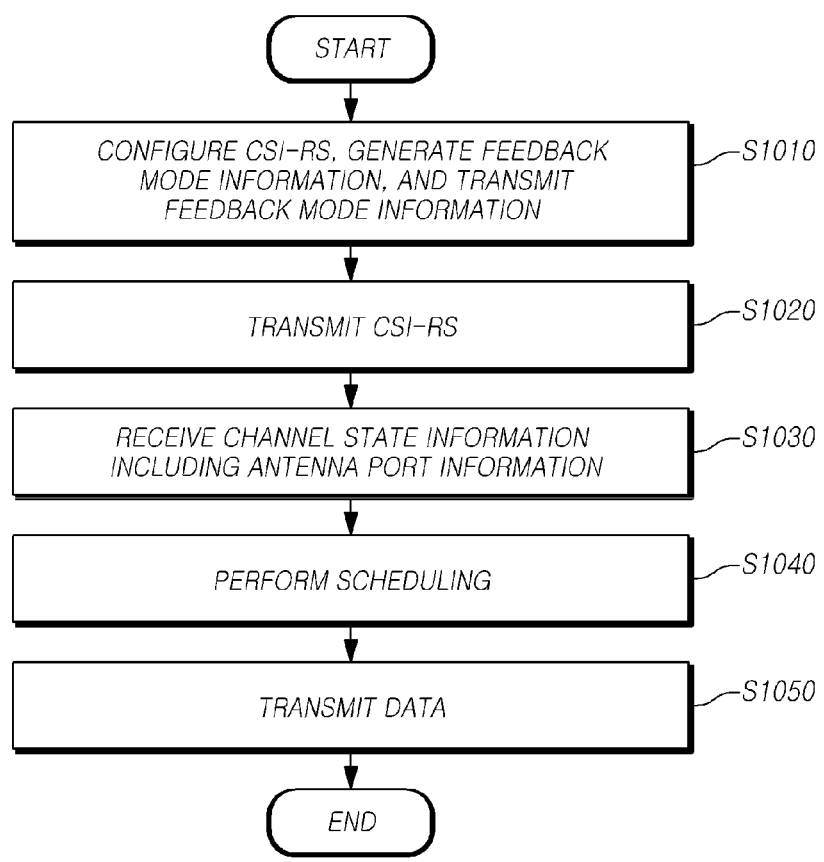
FIG. 11 is a flowchart for describing an operation of an eNB according to an embodiment.

FIG. 11 is a flowchart for describing an operation of an eNB according to an embodiment.

Referring to FIG. 11, in an operation 1000 of an eNB according to an embodiment, the eNB transmits the CSI-RS configuration and the feedback mode information to the UE (S1010). In step S1010, the feedback mode information may include information on whether the UE reports a PMI corresponding to the above-mentioned new precoding matrix or information on whether the UE reports the above-mentioned PI. In addition, the feedback mode information may include information on the feedback timing.

Next, the eNB transmits the CSI-RS according to the CSI-RS configuration (S1020).

Next, the eNB receives the antenna port information included in the PMI or the above-mentioned PI (S1030).

Next, the eNB identifies the area to which the UE belongs through the PMI or the PI, and separately schedules the UEs belonging to each area (S1040).

Next, the eNB transmits data to the UE according to the corresponding scheduling (S1050).

Figure 12:
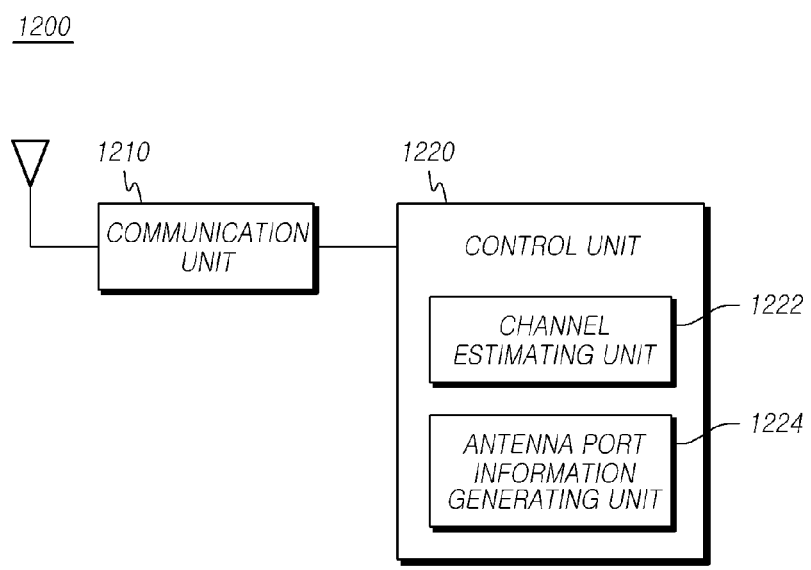
FIG. 12 is a diagram for illustrating a UE according to an embodiment.

FIG. 12 is a diagram illustrating a UE according to an embodiment.

Referring to FIG. 12, a UE 1200 includes a communication unit 1210 and a control unit 1220. The communication unit 1210 receives a CSI-RS and transmits antenna port information. The control unit 1220 generates the antenna port information dividing an antenna port through the received CSI-RS.

The communication unit 1210 receives signals, such as a Reference Signal (RS) including a control channel of an eNB, a data channel, and the CSI-RS, and transfers the signals to the control unit 1220. The communication unit 1210 is used for transmitting or receiving a signal, a message, or data required for implementing the above described present invention, to/from the UE.

The control unit 1220 identifies the CSI-RS and the feedback mode information from reception signals transferred from the communication unit 1210, and controls operations of a channel estimation and a feedback generation. When a specific digital unit for performing the above described operations according to embodiments of the present disclosure supports a data service for a plurality of cell areas using a plurality of antennas, the control unit 1220 controls overall operations of the eNB such that an overall capacity of the digital unit sufficiently may be utilized The channel estimation and the feedback information generation may be a part of the functions of the control unit. Alternatively, there may be a channel estimating unit 1222 and an antenna port information generating unit 1224 additionally, for the channel estimation and the feedback information generation. The channel estimating unit 1222 performs the channel estimation from the CSI-RS transferred from the eNB. The antenna port information generating unit 1224 generates the antenna port information including the PMI or the PI by using the channel estimation information. The generated antenna port information is transmitted to the eNB through the communication unit 1210.

Figure 13:
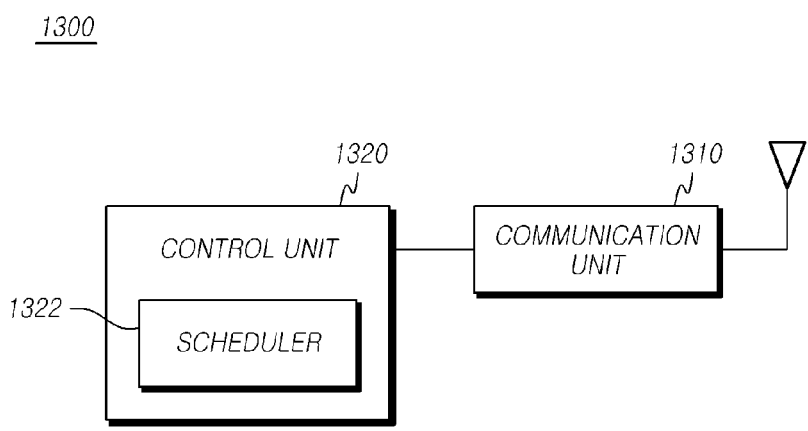
FIG. 13 is a diagram for illustrating an eNB according to an embodiment.

FIG. 13 is a diagram for illustrating an eNB according to an embodiment.

Referring to FIG. 13, an eNB 1300 includes a communication unit 1310 and a control unit 1320. The communication unit 1310 transmits a CSI-RS and receives antenna port information dividing an antenna port from a UE. The control unit 1320 identifies an area to which the UE belongs through the antenna port information, separately schedules the UE belongs to the area, and performs a data transmission.

The communication unit 1310 transmits signals, such as a control channel, a data channel and RS, to the UE, and receives channel state information and the like from the UE. The communication unit 1310 may transmit and receive, to and from a base station, downlink control information, data, a message, through a corresponding channel. The communication unit 1310 may be included in some of the RU shown in FIG. 5 to FIG. 7.

The control unit 1320 generates CSI-RS configuration information, feedback mode information, scheduling information and a data channel. The control unit 1320 may be included in some of the DU shown in FIG. 5 to FIG. 7. When a specific digital unit required to perform the above described operations according to the present disclosure supports a data service for a plurality of cell areas using a plurality of antennas, the control unit 1320 controls the overall operations of the UE such that an overall capacity of the digital unit sufficiently may be utilized.

The scheduler 1322 may perform a scheduling of the UEs. The scheduler 1322 may utilize the feedback information from the UE to identify the area to which the UE belongs. The scheduler 1322 may generate scheduling information according to a corresponding circumstance. Here, the scheduler may be a function of the control unit. Alternatively, the scheduler may be separately from the control unit.

In addition, the communication unit 1310 may receive an uplink signal from the UE. The control unit 1320 may identify whether the uplink signal is received from a specific antenna port to identify the area to which the UE belongs. The control unit 1320 may separately schedule the UE belonging to the area and may perform a data transmission.

The UE 1200 described with reference to FIG. 12 and the eNB 1300 described with reference to FIG. 13 may transmit and receive the antenna port information. Here, the antenna port information may be included in the channel state information or may be included in the newly defined port indicator.

At this time, when the antenna port information is included in the port information, the port information may be received at the timing that is equal to that of the channel state information, or may be transmitted and received in the period corresponding to integer times of the rank index, which is one of the channel state information.

According to the above-mentioned embodiments, a specific digital unit may support a data service for a plurality of cell areas using a plurality of antennas.

According to the above-mentioned embodiment, even in the case in which each cell area serviced by a specific digital unit receives a data transmission through a remote unit having different numbers of antennas, the digital unit may sufficiently utilize a whole capacity thereof, may separately schedule UEs belong to each cell area, and thus may increase the capacity of the whole system.

The above description is merely for the purpose of illustrating the technical idea of the present disclosure, and those skilled in the art will appreciate that various modifications and changes are possible without departing from the scope and spirit of the invention. Therefore, the embodiments of the present disclosure disclosed herein have not been described for limiting purposes, and the scope of the technical idea of the present invention is not limited to these embodiments. The scope of protection of the present disclosure shall be construed on the basis of the following claims in such a manner that all technical ideas within the scope equivalent thereto fall within the scope of protection of the present disclosure.

What is claimed is:

1. A wireless communication system comprising:
a plurality of remote antenna units distributedly installed in a plurality of cell areas and configured to communicate with at least one user equipment, wherein each of the plurality of remote antenna units includes at least one antenna; and
a digital controller configured to include a plurality of output ports and to provide, though the plurality of output ports, a data service for the plurality of cell areas respectively formed by the plurality of remote antenna units,
wherein i) one remote antenna unit having a maximum antenna number of antennas among the plurality of remote antenna units is connected to one of the plurality of output ports of the digital controller and ii) two or more remote antenna units each having antennas fewer than the maximum antenna number among the plurality of remote antenna units are connected to share another of the plurality of output ports of the digital controller, and
wherein the digital controller i) receives, from a specific User Equipment (UE), antenna port information for identifying an antenna port supporting a cell area where the specific UE is located, among the plurality of cell areas, ii) identifies the cell area where the specific UE is located through the received antenna port information, and iii) performs a separate scheduling operation for the specific UE located in the identified cell area.

2. The wireless communication system of claim 1, further comprising:
a signal distributor connected to the digital controller and at least one of the plurality of remote antenna units and configured to distribute a signal transmitted from the digital controller to one of the connected remote antenna units.

3. The wireless communication system of claim 1, wherein at least one of the plurality of remote antenna units is configured to have at least two distributedly installed antennas, and
the digital controller is configured to support a data service for at least two cell areas respectively formed by the at least two distributedly installed antennas of the remote antenna unit.

4. A method of transmitting information of a User Equipment (UE), the method comprising:
receiving a Channel Status Information Reference Signal (CSI-RS) from a base station, wherein the base station includes a plurality of remote antenna units distributedly installed in a plurality of cell areas;
generating antenna port information which identifies an antenna port supporting a cell area where the UE locates, through the received CSI-RS; and
transmitting the antenna port information to the base station, wherein the antenna port information is used, at the base station, to identify the cell area where the UE is located, and
wherein the digital controller i) receives, from a specific User Equipment (UE), antenna port information for identifying an antenna port supporting a cell area where the specific UE is located among the plurality of cell areas, ii) identifies the cell area where the specific UE is located through the received antenna port information, and iii) performs a separate scheduling operation for the specific UE located in the identified cell area.

5. The method of claim 4, wherein the antenna port information is transmitted by being included in at least one of channel state information and port information.

6. The method of claim 5, wherein the channel state information is a Precoding Matrix Index (PMI), and the port information is a port indicator.

7. The method of claim 4, wherein the generating comprises generating ($\log_2 N+1$) bit of antenna port information for identifying all possible combinations of 1, 2, or N antenna ports when a number of the antenna ports is N.

8. The method of claim 4, wherein the generating comprises generating a specific bit of antenna port information for identifying some of all possible combinations of 1, 2, or N antenna ports when the number of the antenna ports is N.

9. The method of claim 5, wherein, when the antenna port information is included in the port information, the port information is transmitted at a timing that is equal to that of the channel state information or transmitted in a period corresponding to an integer times of a rank index which is one of the channel state information.

10. A method of receiving information of a base station, the method comprising:
configuring the base station as including i) a plurality of remote antenna units distributedly installed in a plurality of cell areas and further configured to communicate with at least one user equipment and ii) a digital controller configured to include a plurality of output ports and to provide, though the plurality of output ports, a data service for the plurality of cell areas respectively formed by the plurality of remote antenna units;

transmitting a Channel Status Information Reference Signal (CSI-RS) to a user equipment (UE);

receiving, by the digital controller, from the UE, antenna port information for identifying an antenna port supporting a cell area where the UE is located, wherein the antenna port information is generated by the UE based on the CSI-RS;

identifying, by the digital controller, the cell area where the UE is located through the antenna port information;

performing a separate scheduling operation, by the digital controller, for the UE located in the identified cell area; and performing, by the digital controller, a data transmission.

11. The method of claim 10, wherein the antenna port information is received by being included in one of channel state information and port information.

12. The method of claim 11, wherein the channel state information is a Precoding Matrix Index (PMI), and the port information is a port indicator.

13. The method of claim 10, wherein the receiving comprises receiving ($\log_2 N+1$) bit of antenna port information for identifying all possible combinations of 1, 2 or N antenna ports when the number of the antenna ports is N.

14. The method of claim 10, wherein the receiving comprises receiving a specific bit of antenna port information for identifying some of all possible combinations of 1, 2, or N antenna ports when the number of the antenna ports is N.

15. The method of claim 11, wherein, when the antenna port information is included in the port information, the port information is received at a timing that is equal to that of the channel state information, or received in a period corresponding to an integer times of a rank index, which is one of the channel state information.

16. The wireless communication system of claim 1, wherein the antenna port information is transmitted by being included in a port indicator.

* * * * *